Aug. 16, 1955  D. McKINLAY, JR., ET AL  2,715,332
ELECTRICAL CONNECTIONS FOR ALTERNATING
CURRENT MEASURING CIRCUITS
Filed July 28, 1953  2 Sheets-Sheet 1

Aug. 16, 1955   D. McKINLAY, JR., ET AL   2,715,332
ELECTRICAL CONNECTIONS FOR ALTERNATING
CURRENT MEASURING CIRCUITS
Filed July 28, 1953   2 Sheets-Sheet 2
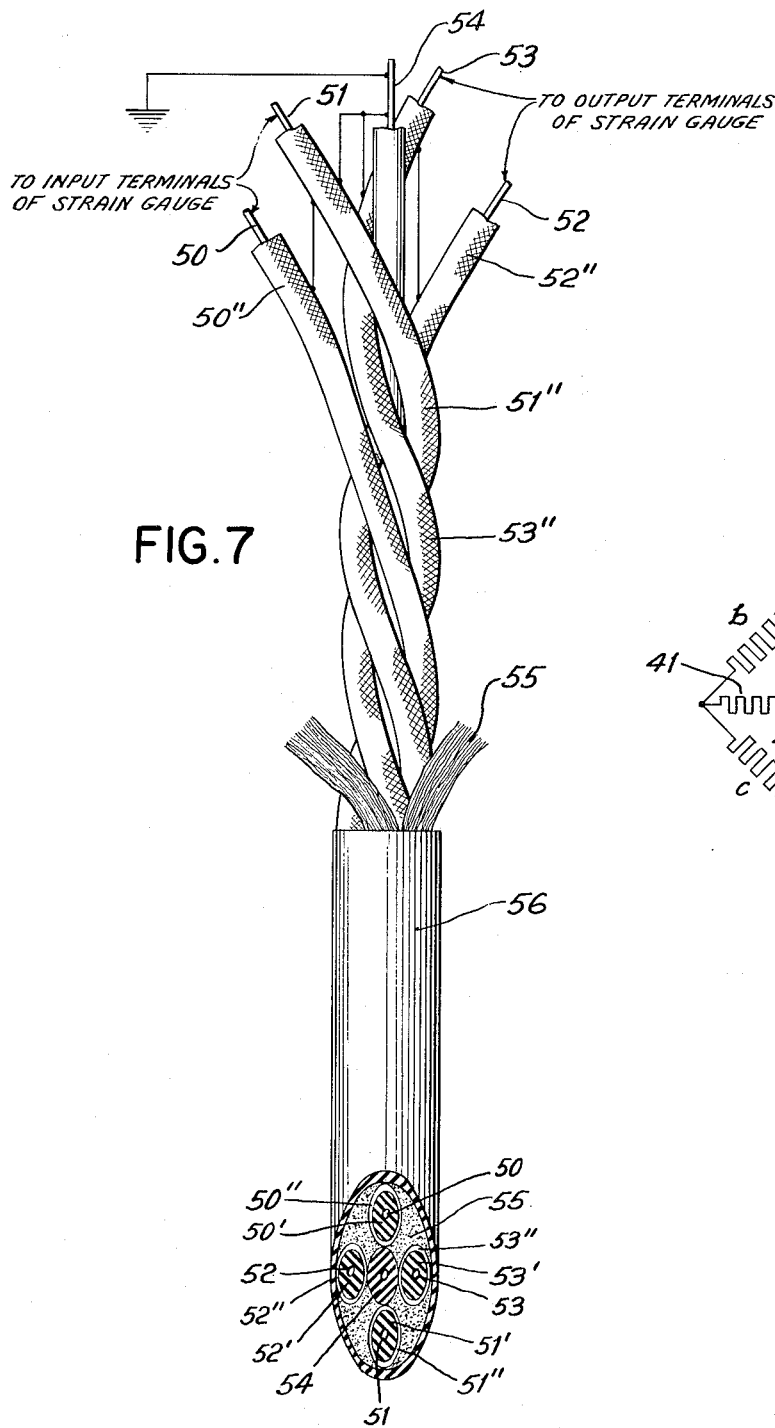
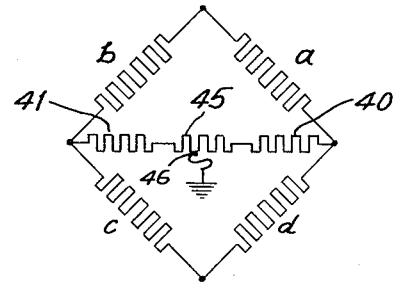

a# United States Patent Office 2,715,332
Patented Aug. 16, 1955

2,715,332

ELECTRICAL CONNECTIONS FOR ALTERNATING CURRENT MEASURING CIRCUITS

Donald McKinlay, Jr., Bethany, and Abraham Walter Jacobson, New Haven, Conn., assignors to The Bristol Company, Waterbury, Conn., a corporation of Connecticut Application July 28, 1953, Serial No. 370,808

7 Claims. (Cl. 73—88.5)

This invention relates to the electrical connections of alternating-current measuring circuits, and more especially to the grounding of circuits used with electrical strain gauges and the like. In the measurement of small mechanical displacements it has become customary to utilize the electrical strain gauge comprising a group of fine wires having appreciable resistance and secured between points whose relative displacement it is desired to determine, and thereby adapted to change their resistance values with dimensional changes attendant upon said displacement. For the purpose of determining the changes in electrical resistance, it is customary to include said wires in a bridge circuit; and for maximum response the wires are connected in a group of four, to constitute the arms of a Wheatstone bridge network and so arranged that as the displacement to be measured takes place the wires representing two opposite arms of the bridge will have their tension increased while those representing the other two opposite arms will have their tension decreased. Strain gauges of this nature are described and discussed in the book "Mechanical Measurements by Electrical Methods," by H. C. Roberts (Instruments Publishing Co., Pittsburgh, 1946), page 332. A more detailed discussion of such gauges is found in a paper "Applications of Unbonded Resistance Gages," by R. D. Meyer, Instruments, vol. 19 (1946), page 136.

With improvements in methods and devices for the detection and measurement of small alternating-current quantities, it has become customary to operate strain gauges and similar devices of the bridge type from alternating, rather than direct-current, sources of supply; and this practice, while characterized by great advantages in operation, presents problems involving capacitive relations between different parts of the measuring circuit and between said circuit and ground, to which problems it is a general object of the present invention to provide a solution.

Specifically, it is an object of the present invention to provide a grounding connection whereby the capacitive relations inseparable from measuring circuits of the nature under consideration shall be opposed in a sense to balance and nullify one another, whereby to reduce their net effect to a minimum.

It is a further object to provide a connection whereby the effect of inductive "pick-up" from adjacent circuits and sources shall be minimized.

It is a further object to provide an adjustment whereby residual undesirable effects due to lack of symmetry in the circuit or its components may be minimized and reduced to negligible magnitude.

It is a further object to provide a unique form of "strain gauge cable" and a system of connection whereby most advantageously to utilize the specific properties of this cable.

While the purposes of the invention may be to a great degree effected when use is made of conventional two-conductor metallic-sheathed cable in the interconnection of physically separated components of the system, the full advantages are realized when use is made of a unique form of cable hereinafter to be described. In general, the purposes of the invention are carried out by providing an "artificial neutral" point in the measuring network, which point is characterized by symmetrical capacitive relationship to mutually corresponding parts of said network, and by grounding said point in a manner to balance the several ground capacitances characterizing the system.

In the drawings:

Fig. 6 is a diagram showing a detail of the invention in a modified form.

Fig. 7 illustrates a form of interconnecting cable especially adapted to the purposes of the invention.

Figure 1:
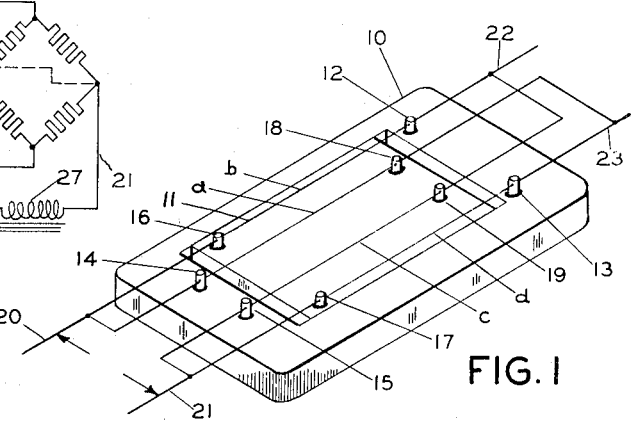
Fig. 1 is an isometric representation of a strain guage to whose use the invention is especially adaptable.

Referring now to the drawings: Fig. 1 represents a primary sensing element to whose use the principles of the invention are especially adapted. This element takes the form of a strain gauge comprising a mounting block 10, internally slotted, and having mounted therein for limited longitudinal displacement in accordance with a strain to be measured, a slidable block 11, said blocks preferably having coplanar surfaces. Insulatedly mounted upon the surface of block 10 near one extremity thereof, and spaced toward the outer edges of the slot are two terminal posts 12—13; and similarly mounted upon the surface of said block near the other extremity thereof, and spaced more closely together than the posts 12—13, are two terminal posts 14—15. Carried by the block 11 and insulatedly mounted thereon are two terminal posts 16—17 having the same spacing as the posts 12—13 and in alignment therewith parallel to the direction of translation of said slidable block, and also two terminal posts 18—19 having the same spacing as the posts 14—15 and similarly in alignment therewith. Extended between the respectively aligned terminal posts 18—14, 12—16, 19—15 and 13—17, are four filamentary resistance elements $a$, $b$, $c$ and $d$, formed preferably of wire material having substantial mechanical strength and appreciable electrical resistivity. An alloy of 55% copper and 45% nickel has been found to possess the desired mechanical and electrical characteristics. The four resistance elements $a$, $b$, $c$ and $d$ are made to have approximately equal resistance values, and in assembly are mechanically adjusted to be under substantially equal tension, with the block 11 free to translate within the slot in the block 10 and thereby to vary the tension on said resistance elements. It will be apparent that translation of the block 11 toward the right as seen in Fig. 1 will increase the tension on elements $a$ and $c$, correspondingly increasing their resistance values, while at the same time decreasing the tension and the resistance values of the elements $b$ and $d$. With translation of the block 11 toward the left, the mechanical and concomitant electrical effects on the respective elements will of course be the opposite of those stated.

The four resistance elements $a$, $b$, $c$ and $d$ are combined into an electrical bridge network by electrically connecting terminal posts 14 and 16 to a common conductor 20, posts 15 and 17 to a common conductor 21, posts 12 and 19 to a common conductor 22 and posts 13 and 18 to a common conductor 23. By adjusting the values of the elements so that $a/b = d/c$, or $a \times c = b \times d$, there is obtained a balanced bridge, wherein application of potential between the conductors 20—21 will produce no potential difference between the conductors 22—23, and vice versa. (In general, optimum conditions will be obtained when the four resistance elements are made of equal value.) It will be seen that with translation of the block 11 relatively to the block 10 as described the resistance values of the respective arms of the bridge network will be varied to produce a condition of electrical unbalance, and that the sense, or polarity, of this unbalance will be dependent upon the direction of said translation. By properly selecting the physical and electrical characteristics of the wires constituting the resistance elements, and by incorporating the bridge so formed in a suitable electrical measuring network the latter may be made highly responsive to relative displacements of the blocks 10 and 11, thereby comprising an electrical strain gauge of extreme sensitivity.

Figure 2:
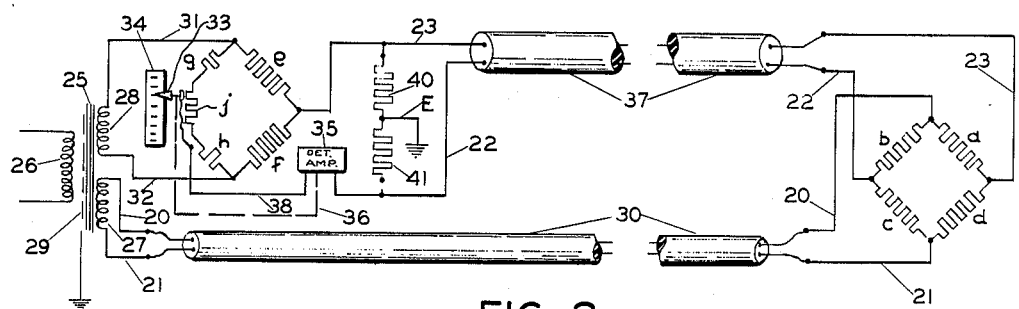
Fig. 2 is a diagram of a remote-indicating installation embodying the type of strain gauge shown in Fig. 1, and incorporating the principles of the invention.

In Fig. 2 is shown the complete circuit and arrangement of a remote measuring strain gauge of conventional form, and to which the present invention may advantageously be applied. The primary sensing element, as represented by the bridge network just described, is of course located on or near, and mechanically attached to, the apparatus (not shown) wherein strains are to be detected and measured. The attachment is made in such a manner that a strain taking place in said apparatus will produce relative displacement of the mounting blocks 10 and 11 as hereinbefore described; and in general the primary sensing element would be positioned in a location more or less remote from the station where its deflections are to be observed, and where, customarily, as much as possible of the measuring apparatus would be located. A transformer 25 is provided with a primary winding adapted for connection to a suitable source of alternating-current supply 26, and with two similar, and mutually isolated, secondary windings 27 and 28. Electrostatic isolation of said secondary windings from the supply system may be provided by means of a grounded shield member 29 juxtaposed to said windings and preferably electrically connected to the core of said transformer. To the terminals of the secondary winding 27 are connected the conductors 20 and 21, whereby to provide an alternating-current power supply for the bridge network comprising the elements $a$, $b$, $c$ and $d$. With said network located more or less remotely from the transformer 25, it is customary to provide both mechanical and electrical protection for the extended connecting line by incorporating said conductors in a two-wire metallic-sheathed cable 30.

To the terminals of the secondary winding 28 are attached conductors 31 and 32 having connected thereacross a measuring network comprising two resistors $e$ and $f$ of mutually equal value and preferably of the same magnitude as the two corresponding resistors $a$—$b$ in the primary sensing element, and also comprising a series arrangement of the two resistors $g$ and $h$ of fixed value connected across the conductors 31 and 32 with a slide-wire resistor $j$ connected therebetween. Said last-named three resistors are thus in parallel with resistors $e$—$f$, to the sum of which their total combined value is preferably made equal. The sliding contact member of the resistor $j$ is provided with an indicating or recording element 33 adapted to cooperate with a graduated scale or chart 34 in providing an indication or a record of the translated position of said contact member. The resistors $e$, $f$, $g$, $h$ and $j$ thus provide a network wherein balance for a potential applied between the conductors 31 and 32 may be established by positioning of the contact member of the resistor $j$ until the potential between said contactor and the junction point of the resistors $e$ and $f$ attains a zero value. A detector-amplifier-motor member 35 is connected to the contact member of the resistor $j$ by mechanical means generally designated by the numeral 36, and is arranged to be directionally responsive to electrical potentials applied thereto to position said contact member within its range of operation.

The conductors 23 and 22, being brought from the primary sensing element through a metallic sheathed cable 37, are connected respectively to the junction point of the resistors $e$ and $f$ and to one terminal of the detector 35, and electrical connections of the measuring system are completed by means of a conductor 38 connecting the other terminal of said detector to the translatable contact member of the resistor $j$.

The apparatus as thus far described may be taken as representing the prior art, and for it no invention is herein claimed. The operation, however, may be briefly explained. When the bridges represented by the resistors $a$, $b$, $c$ and $d$ in the primary sensing element and by the resistors $e$, $f$, $g$, $h$ and $j$ in the measuring network are both balanced, voltage from the secondary winding 27 and impressed upon the formed bridge will produce no potential between the conductors 22—23, and voltage derived from the secondary winding 28 and impressed upon the latter bridge will produce no potential between the conductors 23—28. Thus, there will be no potential between the conductors 22—38, to which the terminals of the detector 35 are connected, and the balancing mechanism will remain at rest.

Upon an unbalance of the bridge in the primary sensing element, as will result from relative displacement of the blocks 10—11 (by which are supported the resistors $a$, $b$, $c$ and $d$) there will appear between the conductors 22—23 an unbalance directionally and quantitatively representative of said displacement; and this potential, transmitted through the cable 37, will be impressed in series with that derived from the measuring bridge, upon the terminals of the detector-amplifier-motor unit 35. Relative polarities having been suitably selected, response of the unit 35 will adjust the contact along resistor $j$ in such a sense that the potential appearing between said contact and the conductor 23 will oppose that existing between the conductors 22—23, tending to reduce the net potential impressed upon the detector 35; and this adjustment will continue until the potential upon the detector has attained a zero value, restoring an over-all condition of electrical balance in the network. The translated position of the indicating or recording member 33 will thus become a measure of the original unbalance of the primary sensing element, whereby to provide an indication, or a record (as the case may be) of the relative displacement of the blocks 10 and 11, or of the strain existing between the points to which said blocks are mechanically attached.

In the alternating-current operation of measuring networks of the class described, it has been found that the electrical capacitance existing between juxtaposed conductors may have a marked effect on the performance. This applies particularly to the capacitance between the two connectors in each of the cables, and also between each of these conductors and the sheath of the cable. If it were possible to construct cables to such a degree of precision that the capacitance from each of the conductors to the sheath were equal to that of the other conductor to the sheath, there would result a certain degree of balance wherein these effects tend mutually to nullify; but commercially produced cables lack the desired exactitude of construction, with a concomitant and significant degree of inequality between said capacitance values. The effect of capacitance conditions will be better understood by reference to Fig. 3, wherein are schematically shown the electrical locations of various capacitance elements in the circuit, with respect to the primary sensing element.

Capacitances from conductors 20 and 21 to the sheath of cable 30 are indicated as capacitors $C_1$ and $C_2$ respectively, and those from conductors 23 and 22 to the sheath of cable 37 as capacitors $C_3$ and $C_4$ respectively. The interconductor capacitance of cable 30 is indicated as capacitor $C_5$, and that of cable 37 as $C_6$. It may be assumed that both cable sheaths will be grounded, and to avoid parasitic potentials therebetween they should be given a definite and common ground point as at G. It will be understood that the terms "ground" and "earth" are herein used synonymously and in the broadest sense. Thus, ground connection implies electrical connection not necessarily restricted to the earth proper, but also to mountings, frameworks, casings and other structures of a conducting nature not forming essential parts of the electrical circuits, but between which and said circuits appreciable electrical capacitances may exist.

Figures 3, 4:
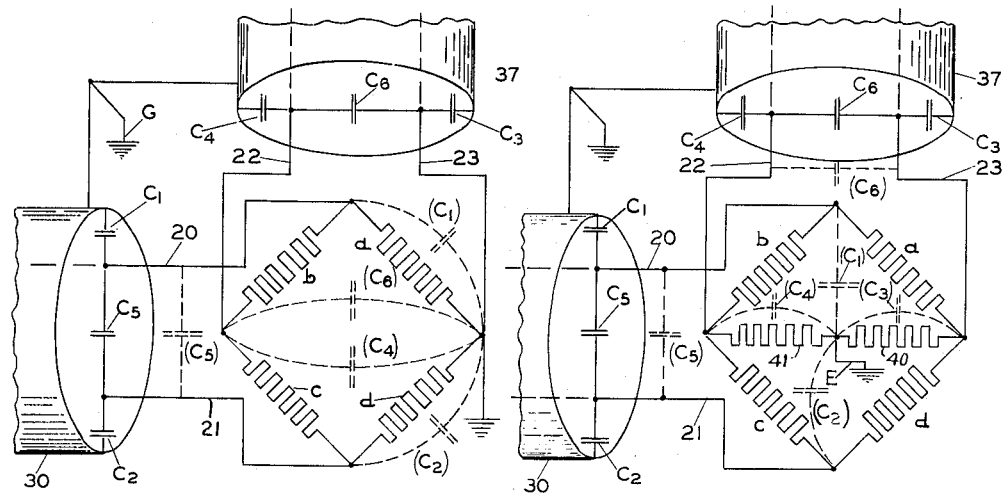
Figs. 3 and 4 are diagrams representing electrical characteristics of installations respectively without, and with, the invention applied thereto.

In order to eliminate objectionable "pick-up," it is necessary to reduce to a minimum value the possibility of electrical potential between the measuring circuits and ground; and for this reason it becomes necessary to provide a positive ground point on said circuits as well as on the cable sheaths. From a consideration of Fig. 3, however, it will be seen that grounding of any normally available point in the network is likely to be attended with asymmetrical conditions which will give rise to objectionable potential differences in the sensitive detector. As an example, Fig. 3 is shown as with the conductor 23 definited grounded, whereby the potential between said conductor and the cable sheaths will be reduced to zero, and the capacitor $C_3$ may be considered as short-circuited. The remaining capacitors are shown dotted in the diagram, as being transferred to their locations in the network under the given ground condition (and are so designated with their numerals parenthetically enclosed). It will be observed that each of the capacitances $C_1$, $C_2$, $C_4$ and $C_6$ has one side connected to ground, that the first two of the same are connected across the bridge arms $a$ and $d$ respectively, and that the latter two are in parallel between the conductors 22—23. The electrical location of capacitor $C_5$ is not affected by the grounding shown; and this capacitor, being directly across the input terminals of the bridge network, will not affect its effectiveness as a measuring means. Neither will the performance of the system be appreciably influenced by the capacitances $C_4$ and $C_6$, appearing in parallel across the output terminals of the bridge network.

If the values of the resistance arms $a$ and $b$ are mutually equal and those of the capacitances $(C_1)$ and $(C_2)$ mutually equal, such quadrature currents as may flow in said capacitors will not disturb the bridge balance, and therefore will not affect the accuracy of measurement. An inequality, however, between the resistors, as will occur under conditions of strain to be measured, or between the capacitances, as may normally be found in manufactured cable, may give rise to quadrature currents comparable in magnitude to the in-phase currents to which the detector is normally responsive, and by overloading the latter, especially as bridge balance conditions are approached with consequent reduction of the "error signal" to infinitesimal values, render the system insensitive under those conditions where maximum sensitivity is important. Thus, it will be seen that, with the conductor 23 grounded, performance of the measuring network will be adversely affected by any inequality which may exist or develop between the respective capacitances of the input line conductors to the sheath of the cable in which they are enclosed. In a similar manner, it may be demonstrated that there is no point normally accessible in the network where a ground connection may be made without the resultant possibility of introducing objectionable quadrature currents due to lack of symmetry in the interconnecting cables.

It will now be shown, however, that the effect of unsymmetrical cable properties can be eliminated by the expedient of providing an "artificial neutral" point to which ground connection may be made. Such a neutral may be established, as shown in Fig. 2, by connecting in series between the bridge output conductors 22—23 a pair of equal resistors 40 and 41 of high value with respect to the bridge arms, and utilizing their common junction as a ground point, as indicated at E. The magnitude of the resistors 40—41 is preferably made high in relation to the bridge arms and low in comparison to the impedance represented by the cable capacitances. As an example, a practical medium between the commonly employed values of strain-gauge resistors and metallic-sheathed cable of commercial grade, when used on a frequency of 60 cycles per second, is found in the designation of a value of 5,000 ohms each for the resistors 40—41.

The redistribution of capacitances resulting from the transfer of the ground connection from a point on the network, as indicated in Fig. 3, to the "artificial neutral" will be apparent by inspection of Fig. 4. Capacitances $(C_5)$ and $(C_6)$ will appear across the input and output terminals respectively of the bridge, and will not affect the measurement. For the same reason, the series-connected resistors 40—41, being connected across the output terminals of the bridge, while slightly reducing the sensitivity of the detector's response, will not influence the bridge balance or otherwise affect the accuracy of measurement. The impedance values of the resistors 40—41 being low relative to that of the associated capacitances $(C_1)$, $(C_2)$, $(C_3)$, and $(C_4)$, each of which now has one side connected to the point E through ground, the symmetrical position of said point with respect to the network—or, in other words, of the network with respect to ground—will not be appreciably disturbed by the presence of said capacitances. $(C_1)$ and $(C_2)$ now appear in series across the input terminals of the bridge; while $(C_3)$ and $(C_4)$ appear in series across the output terminals of the bridge. With the common ground point E maintained, as it is, in an electrical location symmetrical with respect to the four terminals of the bridge, such inequalities between any two of the capacitance values as may be encountered in practice can have no appreciable effect upon the balance of the bridge, or, therefore, on the accuracy of measurement accomplished thereby.

Figure 5:
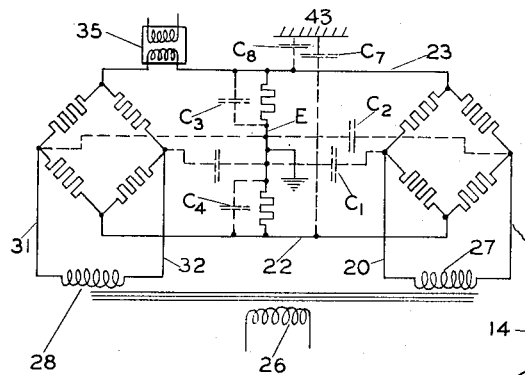
Fig. 5 is a condensed diagram illustrating the inherent electrical symmetry of a measuring network with the invention applied thereto.

A further advantageous effect of the inherent symmetry of the measuring network when provided with an "artificial neutral" as described, is shown in Fig. 5, which diagrammatically represents the system wherein the output leads from the bridge network to the detector are exposed to capacitative coupling with a conductor 43 forming a part of an external power system. The coupling between said conductor and the conductors 22 and 23 of the bridge output is represented by capacitances $C_7$ and $C_8$. Since in the great majority of industrial installations the distance between the conductors of the external supply and those of the measuring system would be much greater than the distance between the conductors 22 and 23 in the network, it may be assumed that the capacitances $C_7$ and $C_8$ are of substantially equal value. Thus, any potential to ground electrostatically induced in the conductor 22 from the conductor 43 would be balanced by a similar potential induced in the conductor 23; and, while both these potentials would drain to ground through the resistors 40 and 51 respectively, they would be in opposition in so far as involves the possibility of affecting the detector 35.

While the resistors 40 and 41 establishing the "artificial" neutral point of the network have been specified as of equal value, it is conceivable that there may arise instances where the lack of symmetry among components of the circuit is such that the capacitive effects are not fully balanced out, giving rise to an objectionable quadrature potential in the measuring network. As a refinement, there may be added to the circuit an adjustable potential-dividing resistance section 45, as shown intermediate the resistors 40 and 41 in Fig. 6, and having a translatable contact member 46 connected to ground. By suitably positioning the contact member 46 along the associated resistor 45, the objectionable quadrature component may be substantially eliminated and compensation effected for the lack of symmetry.

In Fig. 7 is shown a form of "strain-gauge cable" which may advantageously be employed alternatively to the pair of shielded two-conductor cables 30—37 shown in Fig. 2. The cable shown in Fig. 7 comprises four separate insulated wires 50, 51, 52 and 53, symmetrically and circularly disposed with equal spacing about a central conductor 54. Each of said wires 50, 51, 52, and 53 is surrounded by insulating material as indicated at 50′, 51′, 52′, and 53′, respectively; and the insulation of each of said wires is in turn surrounded by a respective one of a plurality of electrically conductive sheaths 50″, 51″, 52″, and 53″.

In order to maintain the uniform circumferential distribution and to facilitate cabling, the four outside conductors are spaced by a filler 55 of hemp or equivalent resilient material. The central conductor 54, which provides a definite ground connection common to both extremities of the cable, may be bare or insulated, as desired. The structure comprising said conductors and fillers is uniformly twisted, and is enclosed in a suitable insulating sheath 56 of neoprene or equivalent material. Whether or not the individual conductive sheaths 50″, 51″, 52″, and 53″ in the cable structure make electrical contact with each other is immaterial, as in use these sheaths are definitely bonded together, as indicated, at each extremity of the cable, and are metallically connected to ground. In use, two diametrically opposite conductors, as 50 and 51, are connected to the "input" terminals of the strain-gauge member, corresponding to conductors 20 and 21 in Fig. 2, and the remaining two opposite conductors 52 and 53 are connected to the "output" terminals as conductors 22 and 23 in Fig. 1.

Comparison of Fig. 7 with Fig. 2, and with the diagrammatic representation of Fig. 4 shows that the distribution of conductor-to-ground capacitances remains substantially unchanged, but that the inter-conductor capacitances $C_5$ and $C_6$ have been substantially eliminated from the network.

As has been indicated, hereinabove, in addition to avoiding capacitive coupling between the circuits it is also important that the effect of inductive pick-up from adjacent circuits and sources be minimized. Due to mutual inductance between juxtaposed wires in the cable, the alternating current which flows in the input wires at all times, whether or not the network be balanced, will set up or induce potentials in the output conductors, and, unless symmetry of disposition exists, will reduce the accuracy of measurement. Conductive shielding, because of eddy-currents in the shield, only partially weakens the effect of mutual inductance. The symmetrical arrangement of conductors as described including uniform spacing about the periphery of the cable and interconnection of opposed junctions of the bridges by diametrically opposed wires tends to annul the residual inductive influence of the input current upon the potential in the detector circuit.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In an alternating-current measuring network comprising a first bridge network adapted to have its balance condition affected by changes in a condition to be measured, a second bridge network adjustable to produce an output potential of magnitude comparable with the unbalance output potential of said first bridge network, circuit means adapted to apply to the input terminals of one of said bridge networks an alternating potential and to interconnect the output terminals of said bridge networks in a manner to oppose their output potentials, said circuit means comprising a cable having four conductors symmetrically disposed therein, each conductor being independently insulated and provided with a conductive sheath connected to ground, two diametrically opposed conductors of said four being connected to the input terminals of one of said bridge networks to apply said alternating potential thereto, and the other two opposed conductors interconnecting the output terminals of said respective bridge networks through detector means responsive to the difference of said output potentials.

2. In an alternating-current measuring network comprising a first bridge network adapted to have its balance condition affected by changes in a condition to be measured, a second bridge network adjustable to produce an output potential of magnitude comparable with the unbalance output potential of said first bridge network, circuit means adapted to apply to the input terminals of one of said bridge networks an alternating potential and to interconnect the output terminals of said bridge networks in a manner to oppose their output potentials, said circuit means comprising a cable having four conductors, a central conductor around which said four conductors are symmetrically disposed, each of said four conductors being independently insulated and provided with a conductive sheath, the conductive sheaths of said four conductors being electrically connected to said central conductor for grounding two diametrically opposed conductors of said four being connected to the input terminals of one of said bridge networks to apply said alternating potential thereto, and the other two opposed conductors interconnecting the output terminals of said respective bridge components through detector means responsive to the difference of said output potentials.

3. In an alternating-current measuring network comprising a first bridge network adapted to have its balance condition affected by changes in a condition to be measured, a second bridge network adjustable to produce an output potential of magnitude comparable with the unbalance output potential of said first bridge network, circuit means adapted to apply to the input terminals of one of said bridge networks an alternating potential derived from a source for the other of said bridge networks and to interconnect the output terminals of said bridge networks in a manner to oppose their output potentials, said circuit means comprising a cable having four conductors symmetrically disposed with a circular distribution, each conductor being independently insulated and provided with a conductive sheath connected to ground, two diametrically opposed conductors of said four being connected to the input terminals of one of said bridge networks to apply said alternating potential thereto, and the other two opposed conductors interconnecting the output terminals of said respective bridge networks through detector means responsive to the difference of said output potentials.

4. In an alternating-current measuring network comprising a first bridge network adapted to have its balance condition affected by changes in a condition to be measured, a second bridge network adjustable to produce an output potential of magnitude comparable with the unbalance output potential of said first bridge network, circuit means adapted to apply to the input terminals of one of said bridge networks an alternating potential and to interconnect the output terminals of said bridge networks in a manner to oppose their output potentials, said circuit means comprising a cable having four conductors symmetrically disposed therein, each conductor being independently insulated and provided with a conductive sheath connected to ground, two diametrically opposed conductors of said four being connected to the input terminals of one of said bridge networks to apply said alternating potential thereto, and the other two opposed conductors interconnecting the output terminals of said respective bridge networks through detector means responsive to the difference of said output potentials, and resistance means connected across said output terminals and having means for connection to ground.

5. In an alternating-current measuring network comprising a first bridge network adapted to have its balance condition affected by changes in a condition to be measured, a second bridge network adjustable to produce an output potential of magnitude comparable with the unbalance output potential of said first bridge network, circuit means adapted to apply to the input terminals of one of said bridge networks an alternating potential and to interconnect the output terminals of said bridge networks in a manner to oppose their output potentials, said circuit means comprising a cable having four conductors symmetrically disposed therein, each conductor being independently insulated and provided with a conductive sheath connected to ground, two diametrically opposed conductors of said four being connected to the input terminals of one of said bridge networks to apply said alternating potential thereto, and the other two opposed conductors interconnecting the output terminals of said respective bridge networks through detector means responsive to the difference of said output potentials, and resistance means connected across said output terminals and adjustable contact means for connection to ground.

6. In combination, a strain gauge of the class comprising a bridge network adapted for energization from an alternating voltage impressed between its input terminals and to have its balance condition affected by a strain to be measured whereby correspondingly to affect the magnitude and phase of potential appearing at its output terminals, a second bridge network adapted for energization from an alternating voltage substantially in phase with said first-named voltage and adjustable whereby to vary the magnitude and phase of potential appearing at its output terminals, circuit means adapted to apply alternating-voltage to the input terminals of said first bridge network and to interconnect the output terminals of both said bridge networks in a manner to oppose their output potentials, said circuit means comprising a cable having four conductors symmetrically disposed therein, each conductor being independently insulated and provided with a conductive sheath connected to ground, two diametrically opposed conductors of said four being connected to said input terminals of said first bridge network to apply alternating voltage thereto, and the other two opposed conductors interconnecting the output terminals of both said bridge networks through detector means responsive to the difference of said output potentials.

7. In combination, a strain gauge of the class comprising a bridge network adapted for energization from an alternating voltage impressed between its input terminals and to have its balance condition affected by a strain to be measured whereby correspondingly to affect the magnitude and phase of potential appearing at its output terminals, a second bridge network adapted for energization from an alternating voltage substantially in phase with said first-named voltage and adjustable whereby to vary the magnitude and phase of potential appearing at its output terminals, circuit means adapted to apply alternating-voltage to the input terminals of said first bridge network and to interconnect the output terminals of both said bridge networks in a manner to oppose their output potentials, said circuit means comprising a cable having four conductors symmetrically disposed therein, each conductor being independently insulated and provided with a conductive sheath connected to ground, two diametrically opposed conductors of said four being connected to said input terminals of said first bridge network to apply alternating voltage thereto, and the other two opposed conductors interconnecting the output terminals of both said bridge networks through detector means responsive to the difference of said output potentials, resistance means connected across said output terminals, and means for connecting said resistance means to ground.

References Cited in the file of this patent

UNITED STATES PATENTS

| 2,393,669 | Wheaton | Jan. 29, 1946 |
| 2,457,165 | McNamee | Dec. 28, 1948 |
| 2,483,300 | Howe | Sept. 27, 1949 |
| 2,625,036 | Cowles | Jan. 13, 1953 |